United States Patent
Fujinuma et al.

(10) Patent No.: US 8,726,929 B2
(45) Date of Patent: May 20, 2014

(54) GAS ENGINE REGULATOR (75) Inventors: Masanori Fujinuma, Wako (JP);
Hiroaki Kojima, Wako (JP); Tsukasa Ebisudani, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 899 days.

(21) Appl. No.: 12/650,023

(22) Filed: Dec. 30, 2009

(65) Prior Publication Data
US 2010/0101540 A1    Apr. 29, 2010

(30) Foreign Application Priority Data

Jul. 22, 2008 (JP) ................................ 2008-188803

(51) Int. Cl.
F16K 31/165    (2006.01)
(52) U.S. Cl.
USPC ................................ 137/505.46; 137/505.47
(58) Field of Classification Search
USPC .............. 137/505.22, 505.36, 505.46, 505.47
See application file for complete search history.

(56) References Cited

U.S. PATENT DOCUMENTS

| 2,744,387 | A | * | 5/1956 | Reed et al. | ..................... | 137/340 |
| 2,952,272 | A | * | 9/1960 | Hansen | ........................... | 137/483 |
| 4,092,963 | A | * | 6/1978 | Vrooman | ....................... | 123/557 |
| 2009/0308352 | A1 | | 12/2009 | Kojima et al. | | |

FOREIGN PATENT DOCUMENTS

| CN | 1959094 A | 5/2007 |
| EP | 2131033 A2 | 12/2009 |
| JP | 53-043119 A | 4/1978 |
| JP | 53-160526 | 12/1978 |
| JP | 59-7022 B2 | 2/1984 |
| JP | 59-022063 B2 | 5/1984 |
| JP | 59-22063 B2 | 5/1984 |
| JP | 63-8309 B2 | 2/1988 |
| JP | 08-500167 A | 1/1996 |
| JP | 2000-192856 A | 7/2000 |
| JP | 2004-197604 A | 7/2004 |
| JP | 2004-218496 A | 8/2004 |
| JP | 2007-64036 A | 3/2007 |
| KR | 2003-0024377 A | 3/2003 |
| WO | 94/04813 A1 | 3/1994 |

OTHER PUBLICATIONS

Chinese Office Action dated Jul. 27, 2012, issued in corresponding Chinese Application No. 201010003330.8, (4 pages).
Japanese Office Action dated Jan. 31, 2012, issued in corresponding Japanese Patent Application No. 2008-188803.
European Search Report dated Apr. 22, 2010, issued in corresponding European Patent Application No. 09180932.7.

* cited by examiner

*Primary Examiner* — William McCalister
(74) *Attorney, Agent, or Firm* — Westerman, Hattori, Daniels & Adrian, LLP (57) ABSTRACT

A gas engine regulator includes a decompression chamber defined internally of the regulator and having a gas inlet through which liquefied gas fuel enters and a gas outlet through which the gas fuel exits. The gas inlet is provided at one end side of the decompression chamber while the gas outlet is provided at an opposite end side laterally spaced via a space from the one end side. The regulator also includes a partitioning wall disposed to surround the gas outlet and having a gas passage communicating with the gas outlet, the gas passage having a passage inlet disposed upwardly of the gas inlet.

4 Claims, 6 Drawing Sheets

GAS ENGINE REGULATOR

FIELD OF THE INVENTION

The present invention relates to an improvement in a regulator for a gas engine.

BACKGROUND OF THE INVENTION

Conventionally, liquefied gas such as LPG is used as fuel for liquefied gas engines. Upon vaporization of the liquefied gas, tar is separated from the gas and produces bad influences on components disposed in a fuel passage. For example, tar adheres to rubber parts such as diaphragms, deteriorating the rubber parts, to fuel jetting holes, choking the holes, and to valves, causing mal-positioning of the valves on valve seats. To avoid such and other problems, techniques are proposed to separate and collect tar from gas fuel, as known from, e.g., Japanese Utility Model Application Laid-Open Publication No. S53-160526 (Patent Document 1), Japanese Patent Post-Exam Publication No. S59-7022 (Patent Document 2), Japanese Patent Post-Exam Publication No. S59-22063 (Patent Document 3), Japanese Patent Post-Exam Publication No. S63-8309 (Patent Document 4), and Japanese Patent Application Laid-Open Publication No. 2007-64036 (Patent Document 5).

Patent Document 1 discloses a vaporizer having a partitioning plate that partitions the inside of the vaporizer into an upper vaporization chamber and a lower tar chamber. The vaporization chamber includes inside a labyrinth structure. Upon vaporization of liquefied gas introduced into the vaporization chamber, tar is separated from the gas and collected in the tar chamber through a through-hole formed in the partitioning plate. Patent Document 2 and Patent Document 3 disclose similar arrangements.

In a low temperature environment, it is likely that non-vaporized liquefied gas contacts separated tar and the tar melts into the non-liquefied gas and flows together downstream. To prevent this, Patent Document 4 discloses an arrangement wherein a fuel passage switching plate is provided for switching from a fuel supply passage for use at a low temperature to a fuel supply passage for use at a high temperature so as to prevent separated tar from contacting and melting into non-vaporized liquefied fuel gas and flowing together downstream when a temperature is low.

Patent Document 5 discloses a removal device having a filter which is disposed on fuel piping upstream of a vaporizer, for removing a gum substance contained in a liquefied gas.

Provision of a labyrinthine structure internally of a vaporizer results in an undesirably large arrangement, as in Patent Document 1, Patent Document 2 and Patent Document 3. One may think of providing a labyrinthine structure in a spatially-limited small general-purpose engine but it is difficult to mold. In addition, tar is liable to accumulate in the resulting arrangement and a large pressure loss may result.

In the arrangement of Patent Document 4, the structure for tar separation and collection is complex due to the provision of the plate for tar separation and collection. In the arrangement of Patent Document 5, when the filter is small, the mesh may be choked up by the gum, requiring frequent maintenance operations. When a large filter is employed so as to avoid the frequent maintenance operations, the gum removal device becomes large.

In the arrangements of Patent Documents 1 to 4, engine-cooling water is circulated to the respective evaporators so as to facilitate evaporation of liquefied gas fuel and to efficiently separate tar from the gas fuel. Application of such arrangements to small general-purpose engines, for example, is difficult because the general-purpose engines are usually air-cooled and effective utilization of engine heat is difficult to achieve. Consequently, there is a demand for an alternative structure that can be employed in such engines for effectively separating and collecting tar from their gas fuel.

SUMMARY OF THE INVENTION

It is therefore an object of the present invention to provide a gas engine regulator which can not only be applied to small-sized general-purpose engines but also is small in size and simple in construction and can efficiently separate and collect tar from gas fuel and prevent the tar from flowing downstream.

According to the present invention, there is provided a gas engine regulator adapted to be disposed in a fuel supply passage for supplying liquefied gas fuel to a gas engine from a source of fuel supply, for decompressing the liquefied gas fuel turned into a gas form, which regulator comprising: a decompression chamber defined internally of the regulator and having a gas inlet through which the liquefied gas fuel enters, and a gas outlet through which the liquefied gas fuel exits, the gas inlet being provided at one end side of the decompression chamber, the gas outlet being provided at an opposite end side laterally spaced via a space from the one end side; and a partitioning wall disposed in such a manner as to surround the gas outlet and having a gas passage communicating with the gas outlet, the gas passage having a passage inlet disposed upwardly of the gas inlet.

Gasified fuel resulted from vaporization of liquefied gas fuel flows through the gas inlet into the decompression chamber and arrives past the space at the passage inlet of the gas passage disposed upwardly of the gas inlet. Then, the gasified fuel enters the gas passage through the passage inlet and exits through the gas outlet communicating with the gas passage so as to flow downstream.

Tar separated from the liquefied gas fuel upon vaporization of the same flows into the decompression chamber through the gas inlet, drops by gravity through the space and accumulates at the bottom of the regulator.

The gas inlet and the gas outlet are disposed at one end and an opposite end of the decompression chamber, respectively, which are largely space apart. In addition, the passage inlet of the gas passage communicating with the gas outlet is disposed upwardly of or higher than the gas inlet. As a result, the tar flowed into the decompression chamber through the gas inlet can hardly arrive at the gas outlet. It also becomes possible to make the tar liable to fall by gravity through the space and easy to collect.

Consequently, the above-described arrangement makes the complex labyrinthine structure, filter and passage switching device as required in the conventional arrangements unnecessary and achieves effective separation and collection of tar, even in a small universal engine in which it is hard to utilize heat generated therein, so as to prevent the tar from flowing downstream of the fuel supply system.

In a preferred form, the gas engine regulator further comprises a vertical passage in the form of a groove provided between the partitioning wall and a peripheral wall of the decompression chamber for allowing passage of tar separated from the liquefied gas fuel. By virtue of the passage or groove, tar adhered to the peripheral wall of the decompression chamber is prevented from entering the gas outlet and hence from flowing downstream as it can be collected beforehand.

Desirably, the gas engine regulator further comprises: a pressure regulating valve for opening/closing the gas inlet; a regulator lever unitarily mounted to the pressure regulating valve; a diaphragm for covering an upper end opening of the decompression chamber, the regulator lever having a pivot shaft at a part located closely to the pressure regulating valve and being connected to the diaphragm at a part distant from the pressure regulating valve; a diaphragm stopping part disposed closely to the gas inlet and higher than the gas inlet for restricting movement of the diaphragm toward the decompression chamber; and a rib extending between the diaphragm stopping part and the partitioning wall. By virtue of the rib, tar is prevented from entering the gas exit and hence from flowing downstream as it can be collected before then.

The rib may include a cutout part provided at a location where the partitioning wall 78 continues, for guiding the tar to flow therealong.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
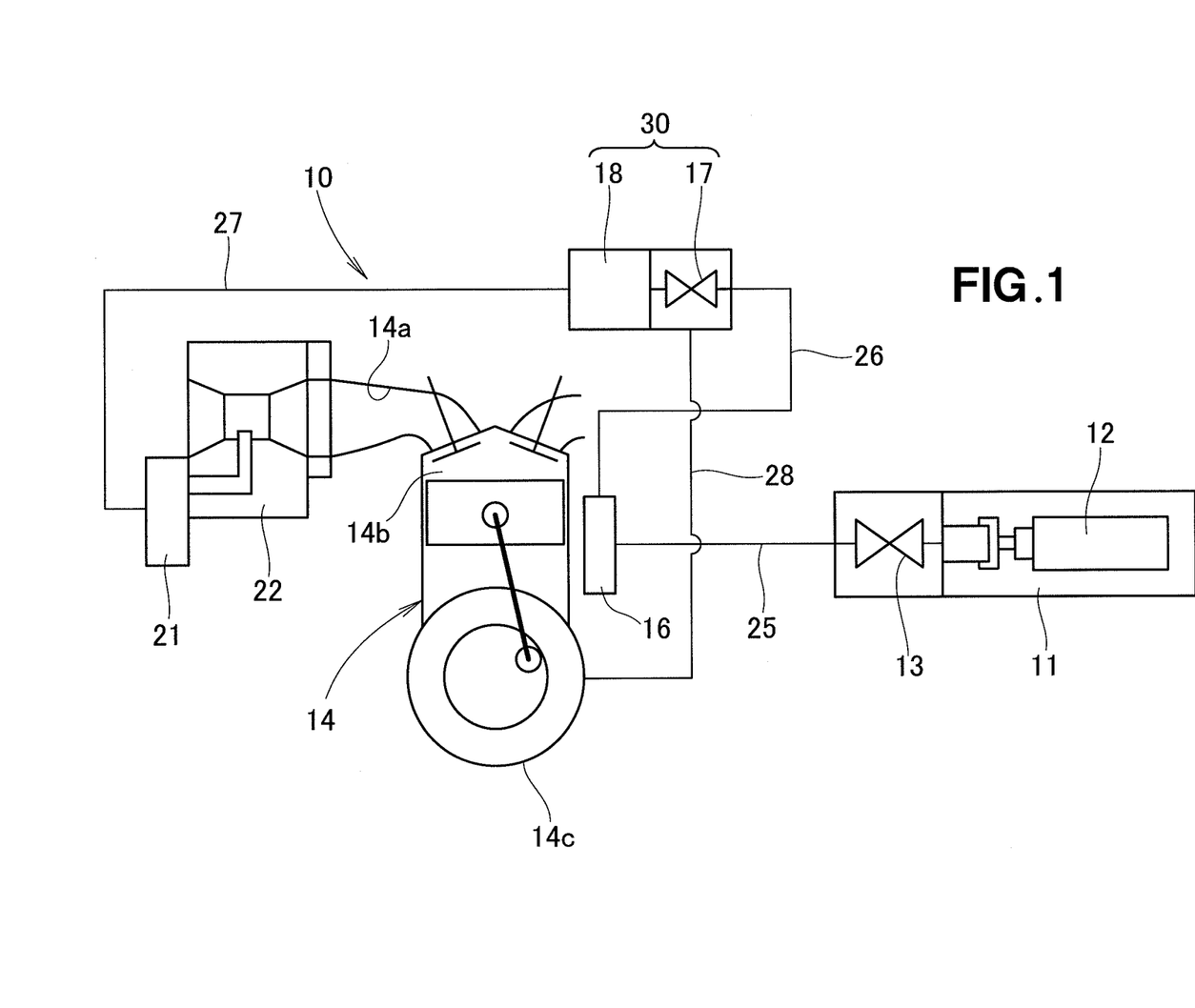
FIG. 1 is a system diagram showing a gas engine fuel supply apparatus employing a primary regulator according to the present invention.

Referring now to FIG. 1, a fuel supply apparatus 10 is comprised of a small gas cylinder 12 filled with, e.g., liquefied butane gas as a liquefied gas fuel and housed in a cylinder case 11, a manually-operated cock 13 fixedly disposed in the cylinder case 11 for switching between the flow of the liquefied gas fuel out from the gas cylinder and the shutoff of the fuel flow, a vaporizer 16 for, utilizing heat generated in a gas engine 14, turning the liquefied gas fuel (liquefied butane) into a gasified fuel (butane gas), a shutoff valve 17 for allowing the fuel gasified at the vaporizer 16 to circulate while the gas engine is in operation and for blocking the flow of the gasified fuel while the engine is out of operation, a primary regulator 18 formed integrally with the shutoff valve 17 for decompressing the gasified fuel to a predetermined pressure, and a secondary regulator 21 for further decompressing the gasified fuel decompressed by the primary regulator 18 to the atmospheric pressure.

The gasified fuel decompressed by the secondary regulator 21 is supplied to a mixer 22 where it is mixed with air. The resultant air/fuel mixture is taken via an intake port 14a of the gas engine into a combustion chamber 14b.

Reference numerals 25 to 27 designate fuel piping. Denoted by reference numeral 28 is a negative-pressure piping that communicates the shutoff valve 17 with a crankcase 14c of the gas engine 14. A negative pressure is generated within the crankcase 14c during an operation of the gas engine and causes the shutoff valve 17 to open. While the gas engine is out of operation, no negative pressure is generated within the crankcase and hence the shutoff valve 17 remains closed. The shutoff valve 17 and the primary regulator 18 together provide a shutoff-valve-integrated regulator unit 30.

Figure 2:
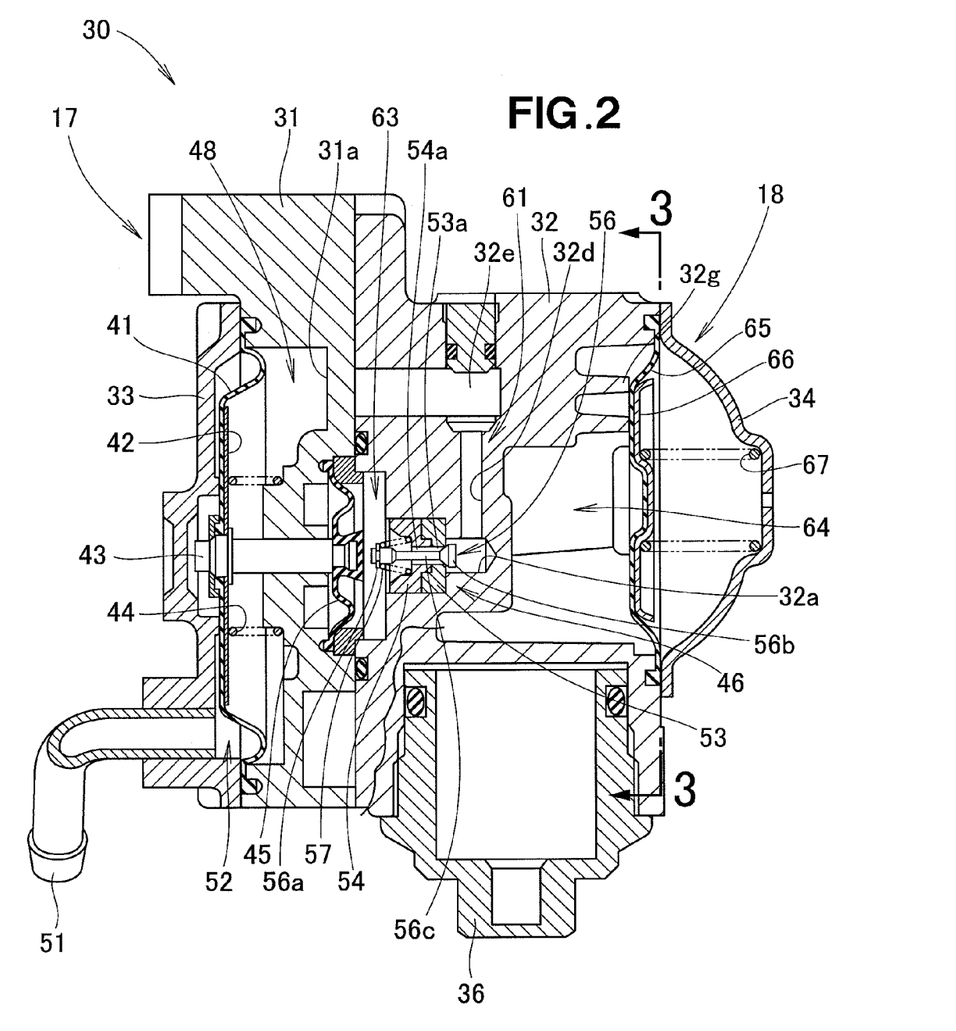
FIG. 2 is a cross-sectional view illustrating the regulator integrated with a shutoff valve and having a decompression chamber of a first construction.

As shown in FIG. 2, the shutoff-valve-integrated regulator 30 includes two adjacent block members 31, 32, a cover member 33 for covering a side opening of one block member 31, a cap member 34 for covering a side opening of the other block member 32, and cup member 36 mounted to a lower part of the block member 32.

The shutoff valve 17 is comprised of a first diaphragm 41 firmly held between the block member 31 and the cover member 33, a support plate 42 for supporting an inner surface of the first diaphragm 41, a rod 43 mounted to a mid-part of the support plate 42, a coil spring 44 for urging the first diaphragm 41 and the support plate 42 toward the cover member 33, a second diaphragm 45 attached to a distal end of the rod 43 movably passed through the block member 31, and a shutoff valve body part 46 disposed on the block member 32 in opposed relation to the distal end of the rod 43.

The block member 31 includes a recessed part 31a, that, jointly with the first diaphragm 41, defines a negative pressure chamber 48 communicating with the crankcase 14c (see FIG. 1) of the gas engine via the negative-pressure piping 28 (see FIG. 1). Reference numeral 51 is a communication pipe mounted to the cover member 33 for communicating an atmospheric chamber 52 formed between the cover member 33 and the first diaphragm with the atmosphere.

The shutoff valve body 46 is comprised of a valve seat 53 engaged in a lower lateral passage 32a formed in the block member 32, a support member 54 for supporting the valve seat 53, a valve 56 passing through through-holes 53a, 54a formed respectively in the valve seat 53 and the valve support member 54, and a spring 57 provided between the valve support member 54 and one end of the valve 56 for urging the valve 56 in its closing direction.

The valve 56 includes a spring support part 56a provided at one end thereof for supporting the spring 57, a valve head 56b provided at an opposite end thereof, and a connecting rod 56c for connecting the spring support part 56a and the valve head 56b.

The valve head 56b is urged by the resiliency of the spring 57 against the valve seat 53. In the Figure, the valve head 56b is positioned to close a fuel passage 61. Namely, the shutoff valve 17 is closed.

The fuel passage 61 is comprised of a central chamber 63 formed in the mating surfaces of the block members 31, 32 and communicating with the vaporizer 16 (see FIG. 1), the through-holes 53a, 54a, the lower lateral passage 32a in which part of the valve head 56b is accommodated, and a vertical passage 32d with one connected to the lower lateral passage 32a, and an upper lateral passage 32e communicating with an opposite end of the vertical passage 32d. The upper lateral passage 32e is in communication with a decompression chamber 64 provided in the primary regulator 18, via a passage not shown.

The primary regulator 18 is comprised of a third diaphragm 65 firmly secured between the block member 32 and the cap member 34, a pressing plate 66 provided on an outer surface of the third diaphragm 65, a spring 67 for urging the third diaphragm 65, via the pressing plate 66, against a stopping part 32g formed in the block member 32, and the cup member 36. The cup member 36 is provided for storing tar flowed down with gas fuel as the gas fuel passes through the decompression chamber 64.

By thus integrating the shutoff 17 and the primary regulator 18, piping for connecting the shutoff valve 17 and the primary regulator 18 is no longer required, thereby reducing the number of required components and rendering the shutoff-valve-integrated regulator small-sized and compact. Man-hours for disposing the piping also become unnecessary. Reduction of the number of components and man-hours leads to the reduction of the costs of production.

Figure 3:
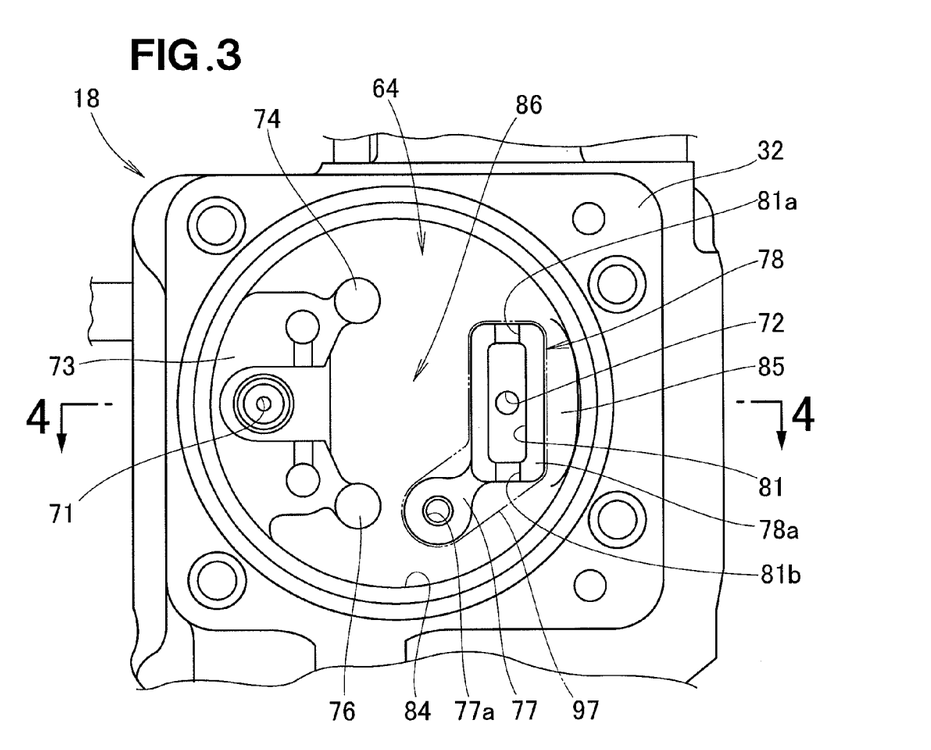
FIG. 3 is a cross-sectional view taken along line 3-3 of FIG. 2.

Reference is now made to FIG. 3 showing in side elevation the primary regulator 18 with the decompression chamber 64 of a first configuration. A gas inlet 71 is formed in the block member 32 at one end of the decompression chamber 64 while a gas outlet 72 is formed in the block member 32 at an opposite end of the decompression chamber 64. The gas inlet 71 and the gas outlet 72 are disposed to be horizontally aligned.

Upper and lower diaphragm stopping parts 74, 76 are provided in an inlet-side wall 73 surrounding the gas inlet 71 for restricting movement of the third diaphragm 65 (see FIG. 2). A partitioning wall 78 is formed in an outlet-side wall 77 disposed around the gas outlet 72 in such a manner as to surround the gas outlet 72. A gas passage 81 extends vertically through the partitioning wall 78 and communicates with the gas outlet 72. Reference numeral 81a designates a gas passage inlet provided at a top end of the gas passage 81. Designated by reference numeral 81b is a gas passage outlet provided at a bottom end of the gas passage 81. The gas passage inlet 81a disposed upwardly of the gas outlet 72 and at a higher level than the gas inlet 71.

The partitioning wall 78 is provided remotely from a circular peripheral wall 84 of the decompression chamber 64. A vertically-long passage 85 in the form of a groove is provided between the partitioning wall 78 and the peripheral wall 84 for allowing passage of tar separated from the gas fuel. With this arrangement, tar separated from the gas fuel upon vaporization of the latter and adhered to an upper part of the peripheral wall 84, for example, is prevented from moving over to the partitioning wall 78 and flowing downstream through the gas outlet 72.

Reference numeral 86 designates a space defined between the gas inlet 71 and the gas outlet 72, namely, between the inlet-side wall 73 and the outlet-side wall 77 including the peripheral wall 78. When tar flew through the gas inlet 71 into the decompression chamber 64, the tar drops through the space 86 down into the cup member 36 (FIG. 2) and accumulates in the latter.

Figure 4:
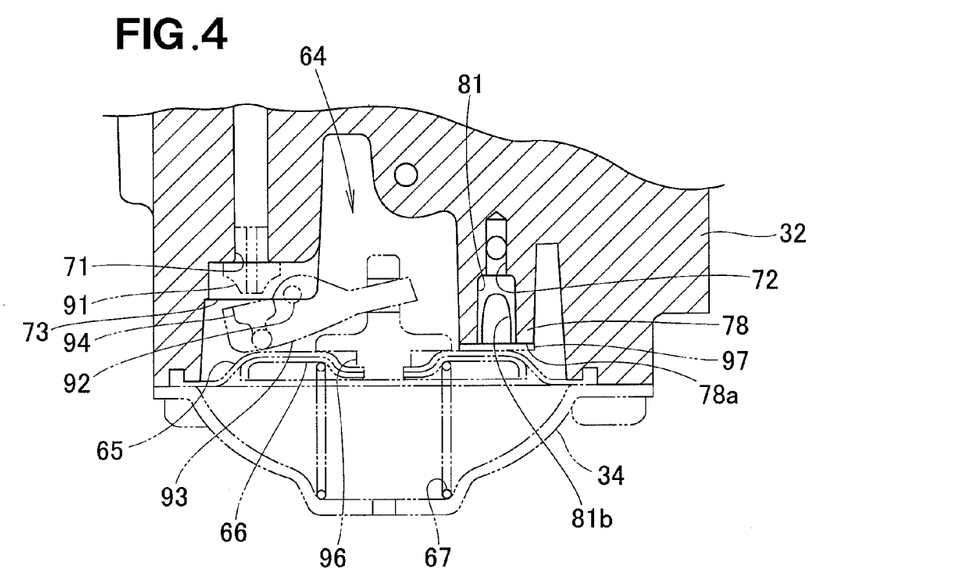
FIG. 4 is a cross-sectional view taken along line 4-4 of FIG. 3.

Turning now to FIG. 4, an orifice 91 is provided at the gas inlet 71. Mounted to the inlet-side wall 73 is a shaft 91 on which a regulator lever 93 is pivotally supported. A pressure regulating valve 94 is mounted to one end of the regulator lever 93 for opening/closing an opening of the orifice 91. Mounted to an opposite end of the regulator lever 93 is a regulator rod 96 which in turn is mounted to the pressing plate 66.

As a result, when the third diaphragm 65 and the pressing plate 66 move in correspondence with the pressure inside the decompression chamber 64, the regulator lever 93 swings about the shaft 92 to thereby open and close the regulator valve 94.

End surface 78a of the partitioning wall 78 is located in a part of the block member 32 deeper than the end surfaces of the diaphragm stopping parts 74 and 76 (FIG. 3). A lid 97 is provided between the third diaphragm 64 and the end surface 78a of the partitioning wall 78 for covering an opening of the gas passage 81 opening toward the cap member 34.

Turning back to FIG. 3, the lid 97 is mounted to the outlet-side wall 77 via a male screw, not shown, so as to cover the partitioning wall end surface 78a entirely. Designated by reference numeral 77a is a female screw for threadedly receiving the male screw. As shown in FIG. 4, the gas passage inlet 81a (see FIG. 3) and the gas passage outlet 81b take the form of a groove provided in the end surface 78a of the partitioning wall 78. Even with the partitioning wall 78 closed by the lid 97, the liquefied gas fuel can flow through the gas passage inlet 81a and the gas passage 81 outlet out from the gas outlet 72.

An operation of the primary regulator 18 will be described next with reference to FIGS. 5A and 5B.

Figure 5A:
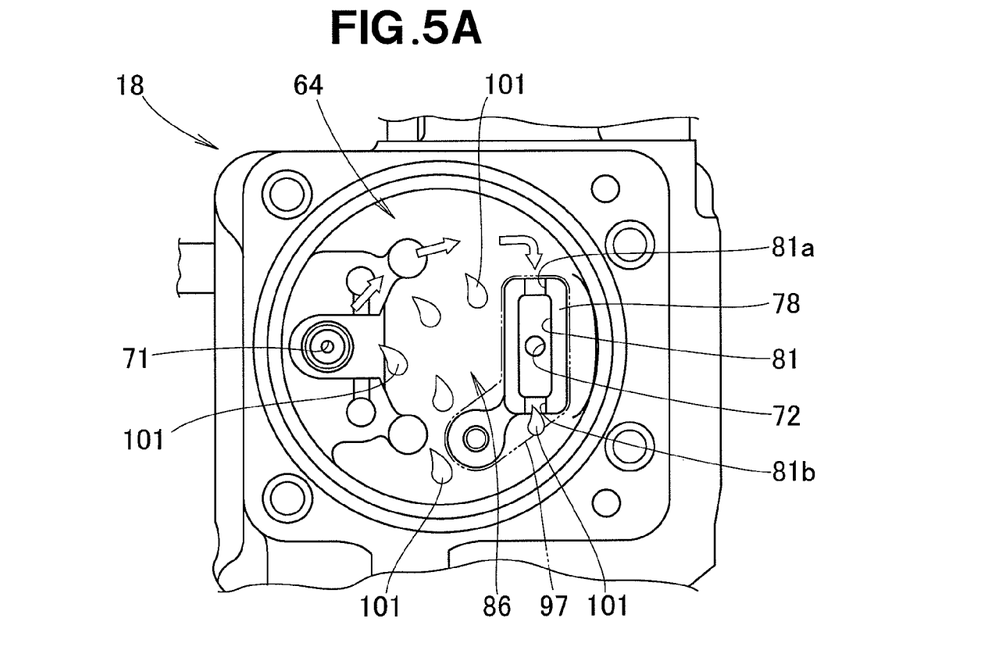
FIGS. 5A and 5B are views illustrating an operation of the primary regulator.

As shown by white arrows in FIG. 5A, the gasified fuel flowed through the gas inlet 71 into the decompression chamber 64 moves to the partitioning wall 78 and flows through the gas passage inlet 81a into the gas passage 81, flows out from the gas outlet 72 and then flows toward the secondary regulator 21 (see FIG. 2).

Tar flowed through the gas inlet 71 into the decompression chamber 64 falls by gravity through the space 86. When parts of the tar 101 entered through the gas passage inlet 81a into the gas passage 81, for example, the tar parts drops in the form of droplets and are discharged through the gas passage outlet 81b into the space 86 and hence are prevented from flowing out from the gas outlet 72.

Figure 5B:
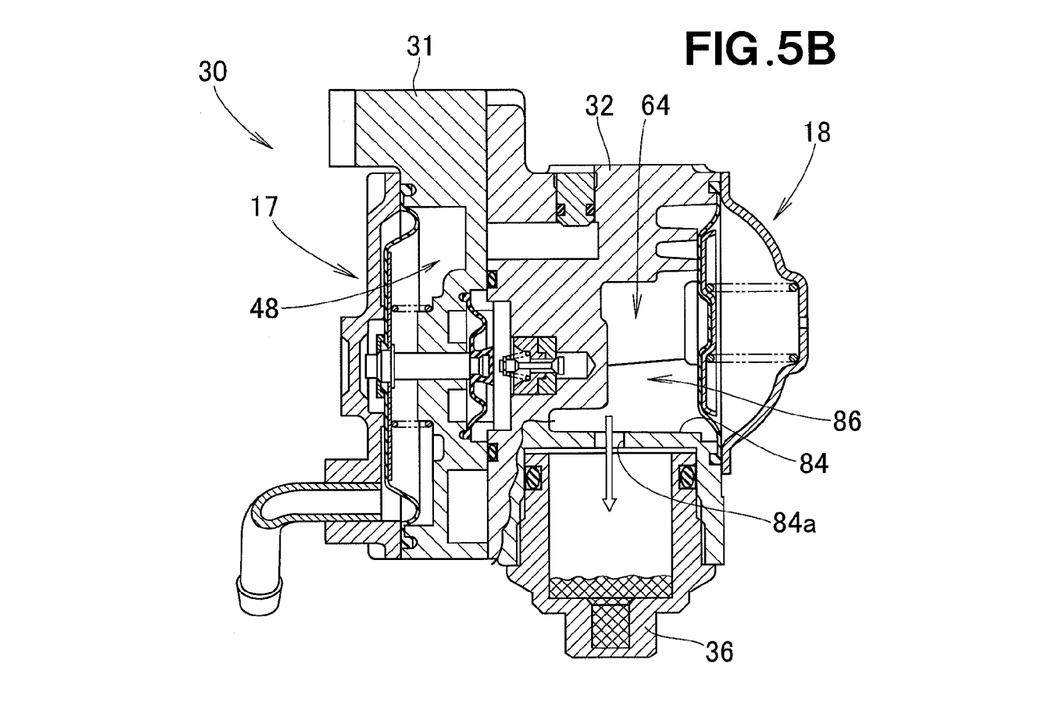

Referring next to FIG. 5B, the tar droplets fell through the space 86 within the decompression chamber 64 pass through a through-hole formed in the peripheral wall 84 of the decompression chamber 64 and accumulate in the cup member 36.

Figure 6:
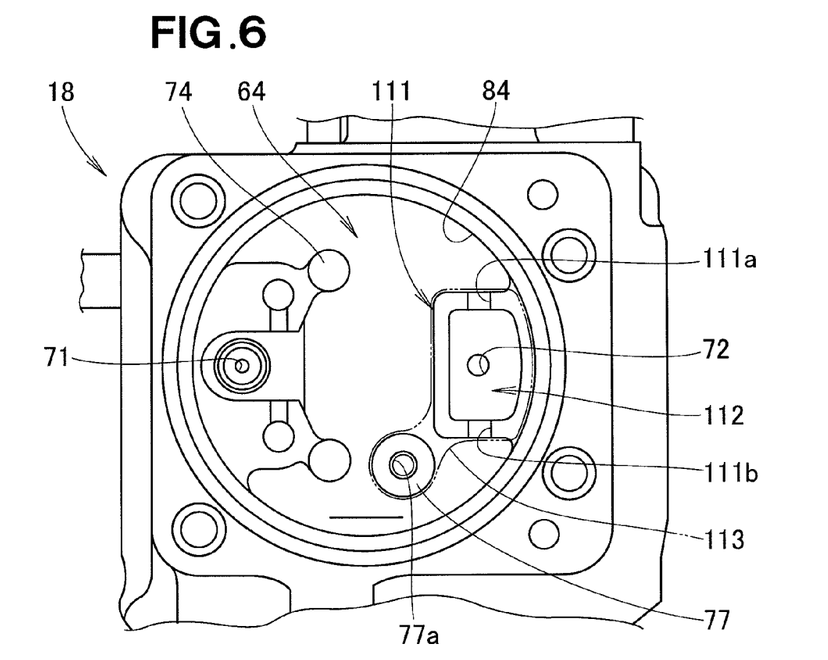
FIG. 6 is a side elevational view illustrating the primary regulator with the decompression chamber of a second construction.

Next, reference is made to FIG. 6 illustrating in side elevation the primary regulator with the decompression chamber of a second configuration. A partitioning wall 111 that surrounds the gas outlet 72 is provided in such a manner as to protrude from the peripheral wall 84 of the decompression chamber 64 toward the gas inlet 71. Provided at upper and lower parts of the partitioning wall 111 are an inner chamber inlet 111a and an inner chamber outlet 111b communicating with the decompression chamber 64 and an inner chamber 112 defined internally of the partitioning wall 111.

The inner chamber 112 opens toward a viewer of the Figure. The inner chamber inlet 111a and the inner chamber outlet 111b comprise grooves formed in an end surface of the partitioning wall 111. Reference numeral 113 denotes a lid mounted to the outlet-side wall 77 in such a manner as to entirely cover the opening of the inner chamber 112.

Figure 7:
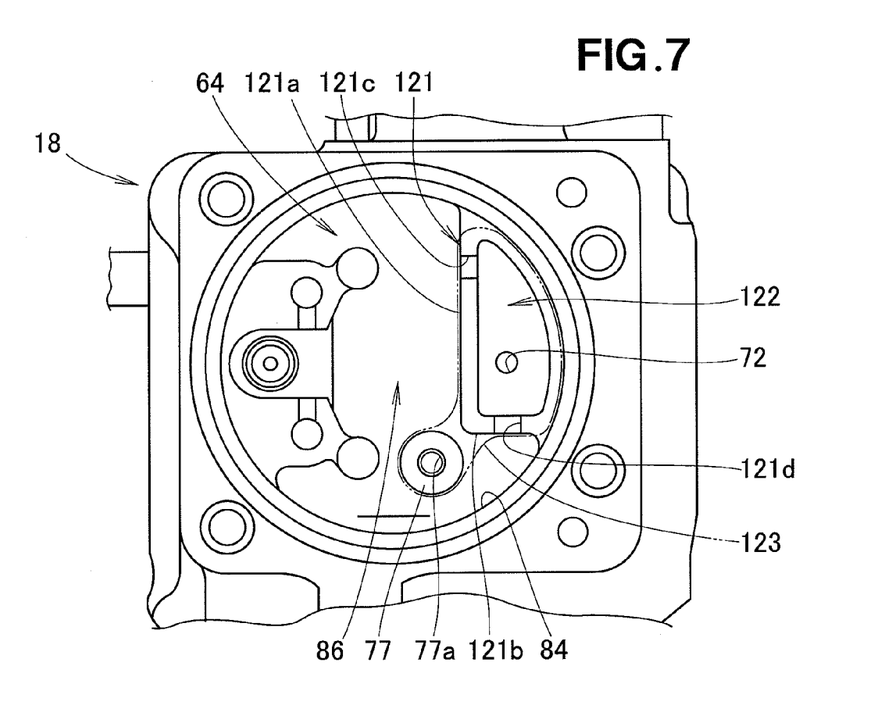
FIG. 7 is a side elevational view illustrating the primary regulator with the decompression chamber of a third construction.

Next, reference is made to FIG. 7 illustrating in side elevation the primary regulator with the decompression chamber of a third configuration. A partitioning wall 121 that surrounds the gas outlet 72 is provided in such a manner as to protrude from the peripheral wall 84 of the decompression chamber 64 and has a sidewall 121a and a lower wall 121b. Provided at the sidewall 121a and lower wall 121b are an inner chamber inlet 121c and an inner chamber outlet 121d that communicate with the decompression chamber and an inner chamber 122 defined in the partitioning wall 121.

The inner chamber 122 opens toward a viewer of the Figure. The inner chamber inlet 121c and the inner chamber outlet 121d comprise grooves formed in the end surface of the partitioning wall 121. Designated by reference numeral 123 is a lid mounted to the outlet-side wall 77 for wholly covering an opening of the inner chamber 122.

By forming the sidewall 121a of the partitioning wall 121 to extend vertically, as shown in the Figure, tar stuck to the top part of the peripheral wall 84 flows on the sidewall 121a down to a lower end of the sidewall 121a and drops into the space 86. As a result, tar is unlikely to get through the inner chamber inlet 121c into the inner chamber 122.

Figure 8:
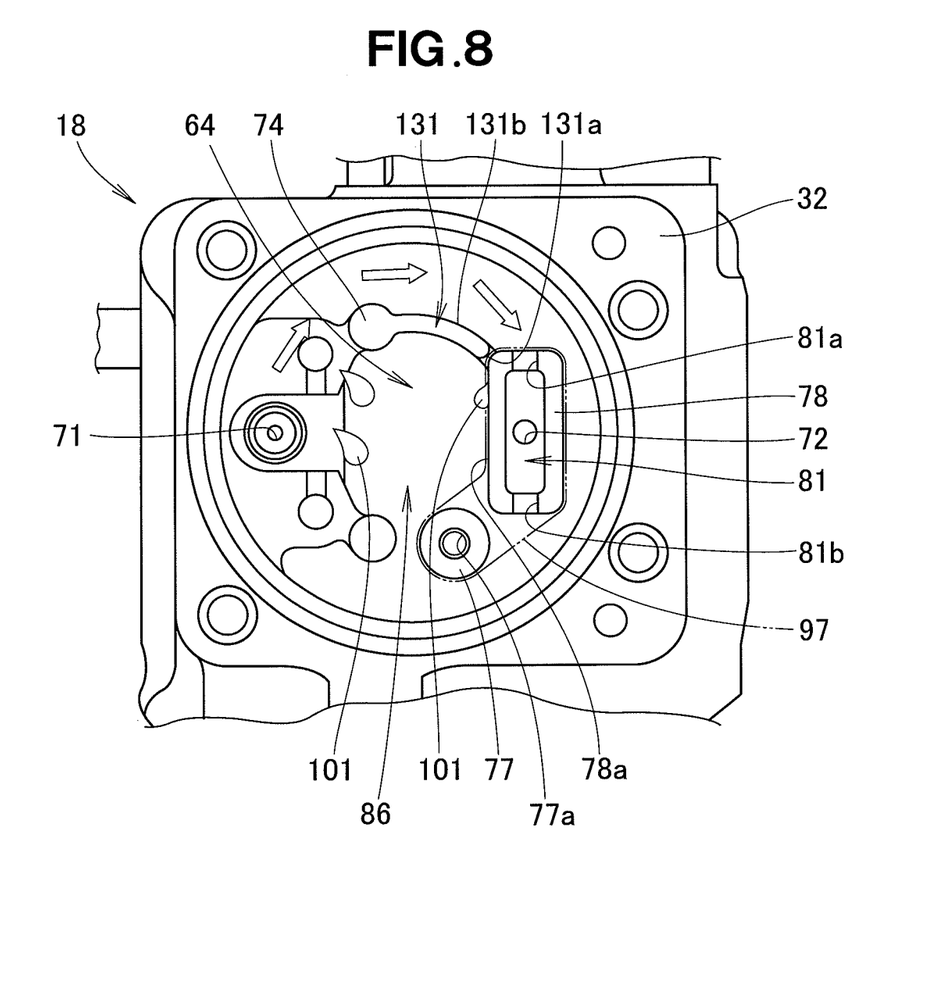
FIG. 8 is a side elevational view illustrating the primary regulator with the decompression chamber of a fourth construction.

Next, reference is made to FIG. 8 showing in side elevation the primary regulator with the decompression chamber of a fourth configuration. An arc-shaped rib 131 is formed in a bulged fashion on the block member and extends from the upper diaphragm stopping part 74 to the partitioning wall 78. The rib 131 includes a cutout part 131a formed at a location where the partitioning wall 78 continues.

When gasified fuel flows out into the decompression chamber 64 through the gas inlet 71, the gasified fuel is guided above the rib 131 toward the partitioning wall 78, as shown by white arrows, making the fuel liable to enter the gas passage 81 via the gas passage inlet 81a.

Being blocked by the rib 131, tar 101 flowed into the decompression chamber 64 through the gas inlet 71 can hardly move over to the gas passage inlet 81a of the partitioning wall 78. When the tar 101 moves to above the rib 131, passes over an upper surface 131b of the rib 131 and moves to the partitioning wall 78, for example, the tar 101 flows onto the inner surface 78a of the partitioning wall 78 via the cutout part 131a and finally drops from the partitioning wall into the space 86. As a result, it becomes possible to reliably prevent the tar 101 from flowing downstream through the gas outlet 72.

To sum up, the present invention provides the primary regulator 18, as shown in FIGS. 1 to 3, which is to be disposed in the fuel supply passage for supplying liquefied gas fuel to the gas engine 14 from the small gas cylinder 12 as a fuel supply source, so as to reduce a pressure of the liquefied gas fuel turned into a gas form. The primary regulator 18 includes the internally defined decompression chamber 64 which in turn includes the gas inlet 71 through which the liquefied gas fuel enters, and the gas outlet 72 through which the gas fuel flows out. The gas outlet 71 is disposed at one end or side of the decompression chamber 64 while the gas outlet 72 is provided oppositely from gas inlet 71 at an opposite side of the chamber 64, with the space 86 interposed between the gas inlet 71 and gas outlet 72. The partitioning wall 78 is disposed to surround the gas outlet 72 and is provided with the gas passage 81 in such a manner as to communicate with the gas outlet 72. The gas passage inlet 81a of the gas passage 81 is disposed upwardly of the gas inlet 71. Thus, the gas inlet 71 and the gas outlet 72 are largely separated from each other. In addition, the gas passage inlet 81a is positioned upwardly of the gas inlet 71. As a result, the tar flowed into the decompression chamber 64 through the gas inlet 71 can hardly arrive at the gas outlet 72. Further, the tar is guided to fall by gravity through the space 83, thus enabling collection of the tar.

As can be readily appreciated from the above discussions, the inventive arrangement provides a simple tar separation/collection structure that can go without a complex labyrinthine structure, a filter and a passage switching device as used in the past. The inventive tar separation/collection structure can work effectively even in a small-sized general-purpose engine wherein it is difficult to utilize generated heat and can prevent tar from flowing downstream of the fuel supply apparatus 10.

It should be noted that in relation to FIG. 8, the rib 131 has been described to extend between the diaphragm stopping part 74 and the partitioning wall 78 but the rib 131 may alternatively be provided to extend between the diaphragm stopping part 74 and the partitioning wall 111 of FIG. 6.

Obviously, various minor changes and modifications of the present invention are possible in light of the above teaching. It is therefore to be understood that within the scope of the appended claims the invention may be practiced otherwise than as specifically described.

What is claimed is:

1. A gas engine regulator adapted to be disposed in a fuel supply passage for supplying liquefied gas fuel to a gas engine from a source of fuel supply, for decompressing the liquefied gas fuel turned into a gas form, the regulator comprising:
   a block member defining a decompression chamber within the regulator and having a gas inlet through which the liquefied gas fuel enters the decompression chamber, and a gas outlet through which the liquefied gas fuel exits the decompression chamber, the gas inlet being provided at one side of the decompression chamber, the gas outlet being provided at an opposite side laterally spaced via a space from the one side;
   a diaphragm covering an upper end opening of the decompression chamber;
   a cup member mounted to a lower part of the block member for storing tar flowing down with the liquid gas fuel as the liquid gas fuel passes through the decompression chamber; and
   a partitioning wall defined by the block member extending through the decompression chamber towards the diaphragm to end adjacent the diaphragm, the partitioning wall further surrounding the gas outlet in a side elevational view of the regulator and having a gas passage communicating with the gas outlet, the gas passage having a passage inlet disposed upwardly of the gas inlet and a passage outlet provided at a bottom end of the gas passage in said side elevational view, the passage outlet also being located below the gas outlet in said side elevational view, the passage outlet not coaxial with the gas outlet,
   wherein tar entering through the gas passage inlet into the gas passage are discharged downwards through the passage outlet and through the space into the cup member accumulating the tar, preventing the tar from flowing out from the gas outlet.

2. The gas engine regulator of claim 1, further comprising a vertical passage in the form of a groove provided between the partitioning wall and a portion of the block member defining a peripheral wall of the decompression chamber for allowing passage of tar separated from the liquefied gas fuel.

3. The gas engine regulator of claim 1, further comprising:
   a pressure regulating valve for opening/closing the gas inlet;
   a regulator lever unitarily mounted to the pressure regulating valve, the regulator lever having a pivot shaft at a part located closely to the pressure regulating valve and being connected to the diaphragm at a part distant from the pressure regulating valve;
   a diaphragm stopping part disposed closely to the gas inlet and higher than the gas inlet for restricting movement of the diaphragm toward the decompression chamber; and
   a rib extending between the diaphragm stopping part and the partitioning wall.

4. The gas engine regulator of claim 3, wherein the rib includes a cutout part provided at a location where the partitioning wall continues.

* * * * *